United States Patent
Chavez (10) Patent No.: US 7,308,499 B2
(45) Date of Patent: Dec. 11, 2007

(54) DYNAMIC LOAD BALANCING FOR ENTERPRISE IP TRAFFIC

(75) Inventor: David L. Chavez, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 971 days.

(21) Appl. No.: 10/427,813

(22) Filed: Apr. 30, 2003

(65) Prior Publication Data

US 2004/0221061 A1 Nov. 4, 2004

(51) Int. Cl.
G06F 15/16 (2006.01)
G06F 15/173 (2006.01)

(52) U.S. Cl. ............ 709/226; 709/224; 709/229; 709/239; 709/240

(58) Field of Classification Search ............ 709/203, 709/219, 223, 225, 226, 230, 231, 238, 239, 709/229, 240
See application file for complete search history.

(56) References Cited

U.S. PATENT DOCUMENTS

| | | | |
|---|---|---|---|
| 5,206,903 A | 4/1993 | Kohler et al. | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,799,214 B1* | 9/2004 | Li ........................ | 709/226 |
| 6,813,635 B1* | 11/2004 | Jorgenson ............. | 709/225 |
| 7,032,037 B2* | 4/2006 | Garnett et al. ........ | 709/223 |
| 7,047,315 B1* | 5/2006 | Srivastava ............ | 709/238 |
| 2001/0034792 A1* | 10/2001 | Swildens .............. | 709/238 |
| 2002/0087722 A1* | 7/2002 | Datta et al. .......... | 709/239 |
| 2002/0194335 A1 | 12/2002 | Maynard | |
| 2002/0194355 A1* | 12/2002 | Morita et al. ........ | 709/231 |
| 2003/0061278 A1* | 3/2003 | Agarwalla et al. ... | 709/219 |
| 2003/0187871 A1* | 10/2003 | Amano et al. ....... | 707/102 |
| 2003/0217147 A1* | 11/2003 | Maynard et al. ..... | 709/203 |
| 2004/0210663 A1* | 10/2004 | Phillips et al. ....... | 709/230 |

FOREIGN PATENT DOCUMENTS

| | | |
|---|---|---|
| KR | 20040055522 | 6/2004 |
| KR | 20040082889 | 9/2004 |

(Continued)

OTHER PUBLICATIONS

"Chapter 9: Domain Name Services" (printed Mar. 31, 2003), at http://www.pism.com/chapt09/chapt09.html, 21 pages.

(Continued)

*Primary Examiner*—Quang N. Nguyen
(74) *Attorney, Agent, or Firm*—Sheridan Ross P.C.

(57) ABSTRACT

A method for effecting load balancing in a packet-switched network is provided. In one embodiment, the method includes the steps of:
(a) providing a set of Internet Protocol (IP) addresses corresponding to a Universal Resource Locator (URL), wherein the ordering of the IP addresses in the set of IP addresses is indicative of a corresponding desirability of contacting each of the IP addresses and wherein the set of IP addresses are in a first order;
(b) receiving activity-related information associated with at least one of the IP addresses; and
(c) reordering the set of IP addresses to be in a second order different from the first order.

35 Claims, 3 Drawing Sheets

FOREIGN PATENT DOCUMENTS

| WO | WO 01/39003 A1 | 5/2001 |
|---|---|---|
| WO | WO 02/05510 A1 | 1/2002 |
| WO | WO 2004/064334 | 7/2004 |

OTHER PUBLICATIONS

"Internet Protocol Addressing" (printed Mar. 31, 2003), at http://www.samspade.org/d/ipdns.html, 9 pages.

BellSouth "Frequently Asked Questions: Domain Name Service FAQs" (printed Mar. 31, 2003, at http://registration.bellsouth.net/NASApp/DNSWebUI/FAQ.jspl, 4 pages.

Douglas W. Stevenson, et al.; "Name Resolution in Network and Systems Management Environments" (printed Mar. 31, 2003), at http://netman.cit.buffalo.edu/Doc/Dstevenson/NR-NMSE.html, 16 pages.

Sarah Ahmed; "A Scalable Byzantine Fault Tolerant Secure Domain Name System," Thesis submitted to Department of Electrical Engineering and Computer Science, Massachusetts Institute of Technology (Jan. 22, 2001), pp. 1-101.

Scott Coles; "A Guide for Ensuring Service Quality in IP Voice Networks," *Communication Without Boundaries*, Avaya White Paper (Jun. 2002), pp. 1-17.

"The Advantage of Load Balancing in the Multi-Call Center Enterprise," *Communicatino Without Boundaries*, Avaya White Paper (Feb. 2002), pp. 1-13.

Robin Foster, et al.; "Avaya™ Business Advocate and its Relationship to Multi-Site Balancing Applications," *Communication Without Boundaries* (Mar. 2002), pp. 1-13.

David Chavez, et al.; "Avaya MultiVantage™ Software: Adapting Proven Call Processing for the Transition to Converged IP Networks," *Communication Without Boundaries*, Avaya White Paper (Aug. 2002), pp. 1-17.

"Voice Over IP Via Virtual Private Networks: An Overview," *Communication Without Boundaries*, Avaya White Paper (Feb. 2001), pp. 1-8.

"Better Implementation of IP in Large Networks," Avaya Application Note (Apr. 19, 2002), pp. 1-14.

Spanlink Communications, "Spanlink Delivers Unified Management Solution for Embarcardero Systems' Multi-Site Contact Center," available at www.spanlink.com, 2002, 4 pages.

European Patent Office Search Report for European Application No. 04252351.4 dated Oct. 8, 2004.

Written Opinion of Examiner dated Jul. 26, 2005 in European Patent App. No. 04252351.4.

Written Opinion of Examiner in counterpart European Patent App. No. 04252351.4, dated Jul. 3, 2006.

Examiner's Report for Canadian Patent Application No. 2,462,096, dated Oct. 31, 2006.

Translation of First Office Action for Chinese Patent Application No. 200410038562.1, dated Apr. 6, 2007.

Translation of List Of Objections raised by the Examiner in an Examination Report for Indian Patent Application No. 360/CHE/2004 (Attorney's Ref. No. 4366-132-IN).

* cited by examiner

DYNAMIC LOAD BALANCING FOR ENTERPRISE IP TRAFFIC

FIELD OF THE INVENTION

The present invention relates generally to load balancing and specifically to load balancing in packet-switched networks.

BACKGROUND OF THE INVENTION

The Domain Name System, or DNS, is a naming scheme for dotted decimal Internet Protocol, or IP, addresses. Every computer, or host, on the Internet has an IP address assigned to it; that is, every host name refers to an IP address. A "domain name" is a logical name or host name assigned to an IP address and used as another type of addressing construct for identifying Internet nodes. Unlike IP addresses, domain names, such as BillSmith@aol.com and www.ultimateelectronics.com, are designed to easily be remembered and used by people. By way of illustration, IP addresses are generally machine readable numeric sequences that are 32 bits in length. A domain name service resolves domain names to IP addresses and vice versa.

The domain name service uses a client/server mechanism, with domain name resolvers as the clients and domain name servers as the servers, and is implemented as a distributed database, existing in a domain name space, whereby each domain generally keeps records only of its next-level subdomains. The domain space is organized hierarchically, with the root domain at the top and the rest of the structure branching from the root domain. All domain name resolvers have a pointer to the root domain (served by multiple servers), which in turn have pointers to all the top-level domains (those one level below the root domain), which in turn have pointers to their subdomains, so that any name within the name space can be queried and resolved efficiently.

In partitioned, packet-switched, distributed processing networks using DNS technology, traffic shaping or load balancing has continued to present challenges to network designers. For example, IP telephony traffic is directed by domain name servers to proxies that further direct the traffic to authoritative domains for the call request. Domain name servers, however, do not shape the call based on traffic. Core proxies that distribute calls to authoritative proxies do not shape traffic either. The current use of IP telephony is predominantly to make calls to individuals (e.g., sip: davidchavez@sip.avaya.com). As IP telephony becomes increasingly popular, users will use IP telephony to place calls to general business or enterprise addresses associated with contact centers (e.g., customer_service@sip.avaya.com) having multiple call servicing agents. For efficient service goals and objectives to be realized, IP telephony calls to contact centers will need to be distributed to agents and proxies to reflect current or anticipated traffic or loads. In other examples, similar problems exist when specific web addresses are too popular at certain intervals. In particular, server farms, for optimal operation, require some type of load balancing to substantially minimize the time required to respond to content requests.

Compared to packet-switched networks, a number of effective load balancing algorithms have been developed for circuit-switched networks. In circuit-switched telephony, incoming trunks are generally spread through the enterprise network of Private Branch Exchanges or PBXs. Within the enterprise, traffic can be shaped through PBX hierarchy or network services for call redirection/deflection. For example in Best Services Routing™ of Avaya, Inc., PBXs communicate with one another regarding their current estimated wait times for call servicing. When a call arrives, the estimated wait times are used to redirect the incoming call to an appropriate PBX. In Network Route™ of Avaya, Inc., an adjunct processor is used to acquire estimated wait times for a plurality of PBXs. Rather than have a call come into a first PBX and then have to redirect the call to a second PBX the adjunct processor uses SS7 technology to shape the Public Switched Telephone Network or PSTN routing so that the call is optimally directed at the outset to the PBX that is best able to handle it.

The load balancing/traffic shaping algorithms used for circuit-switched applications, however, are generally unsuitable for packet-switched applications due to the differing mechanisms used to direct or route incoming contacts. In circuit-switched applications, an OSI Layer 4 network is available to permit redirection of contacts optimally. In packet-switched applications, once a destination IP address is selected there are substantial costs involved with redirect the contact to a different IP address.

SUMMARY OF THE INVENTION

These and other needs are addressed by the various embodiments and configurations of the present invention. The present invention is directed generally to a methodology and system for load balancing or traffic shaping in a partitioned, packet-switched network.

In one embodiment, a method for performing name resolution in the packet-switched network is provided that includes the steps of:

(a) providing a set of first addresses (e.g., Internet Protocol addresses) corresponding to a second address (e.g., host name), the ordering of the first addresses in the set of first addresses being indicative of a relative desirability of contacting each of the first addresses;

(b) receiving activity-related information associated with one or more of the first addresses;

(c) based on the received activity-related information, reordering the set of first addresses to be in a different order;

(d) receiving a resolution query for the second address; and (e) providing one or more of the reordered first addresses in response to the query.

In an exemplary application, each of the set of first addresses is an IP address, the second address is a domain name, and the set of addresses are in an enterprise network. The steps are preferably performed by a domain name server in response to a domain name or URL resolution query requesting mapping of the domain name to an IP address.

The activity-related information is typically provided by one or more nodes in the domain or subdomain for which the domain name server is authoritative. The nodes may be any computational component, such as a telephony switch, a media server, a proxy server, communications adjunct, media gateway controller, and softswitch.

The activity-related information is broadly related to the contact/contactor and/or the destination for the contact. For example, the information can be a performance metric of a telephony switch or media server. Other examples of activity-related information include at least the following: an estimated wait time to service a contact, an actual wait time to service existing enqueued contacts, an available processor capacity, a processor capacity currently in use, a length of a work item queue, an available bandwidth, an unavailable bandwidth, an agent staffing level, an available agent skill level, a purpose of a contact, a skill level required to service a contact, and a number of active sessions.

Based on the activity-related information a suitable algorithm is used to reorder dynamically the first addresses such that the most desirable address for the incoming contact is provided to the contacting device. By way of example, when the activity-related information is wait time the most desirable address typically has the lowest wait time among the first addresses. When the activity-related information is available bandwidth, the most desirable address typically has the highest available bandwidth among the first addresses. When the activity-related information is available processor capacity, the most desirable address typically has the highest available processor capacity.

As noted, the activity-related information can be associated with the contact and/or contactor. For example, the activity-related information can be a qualifier in a domain name or a cookie. As will be appreciated, a qualifier refers to logical subcomponent of a domain name and a cookie to information stored on a user's computer by a Web browser at the request of a Web site visited by the browser. Typically, cookies are used by Web sites to recognize users who have previously visited the site. The next time the user accesses the site, the information in the cookie is sent back to the site so the Web site can know the user's preferences in serving the user.

The methodology and system of the present invention can have a number of advantages. For example, the above methodology can allow IP traffic to be shaped in an IP trunked network in a way not currently possible with SIP/DNS-based technology. By dynamically updating the IP address lists for a corresponding domain name, incoming contacts are forwarded directly to the desirable destination rather than being redirected one or more times by other nodes in the IP address list to the desirable destination. The ability to directly forward contacts to the desired location can not only lead to less network traffic and increased computational efficiency but can also provide increased levels of customer/contactor satisfaction. This can be a potentially important technology for providers that experience heavy bursty type traffic but have geographically dispersed servers that could better handle the offered traffic if the selection of service was better shaped. The ability of the methodology to use qualifiers and cookies can provide guidance as to where to direct the incoming contact to better service the contactor.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Architecture

Figure 1:
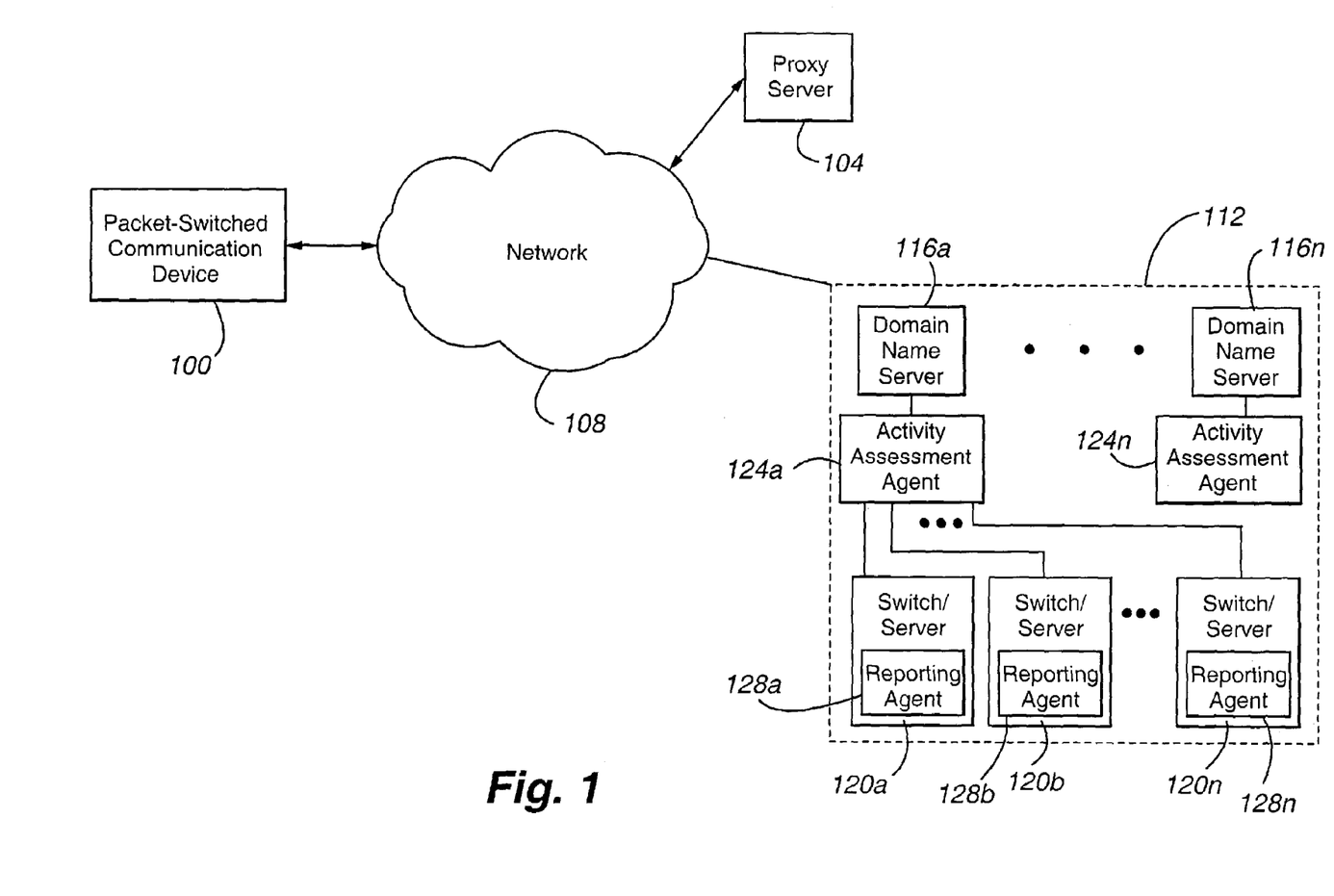
FIG. 1 is a block diagram of an illustrative embodiment of the present invention.

FIG. 1 illustrates an exemplary embodiment of the present invention.

A packet-switched communication device 100 and a proxy server 104 are in communication with a partitioned data or distributed processing network 108. The communication device 100 can be any communication device suitable for the packet-switched network. The communication device 100 can include, for example, IP hardphones, IP softphones, Personal Digital Assistants or PDAs, Personal Computers or PCs, and laptops. The proxy server 104 can be any suitable proxy server, such as a core or authoritative proxy server, whether configured for the Session Initiation Protocol or SIP or any telecommunications protocol such as H.323 and the like. The packet-switched network 108 can be any partitioned data and/or distributed processing network, such as an intranetwork or an internetwork (e.g., the Internet). The network 108 typically includes additional proxy servers (not shown), registrars (not shown), gateways (not shown), and routers (not shown) for managing packet flows.

The dashed box 112 represents a domain or subdomain within the network 108. As will be appreciated, a domain will typically include one or more subdomains (not shown), each of which is serviced by one or more (sub)domain name servers that are authoritative for the subdomain. The domain/subdomain 112 includes a plurality of domain name servers 116a-n that are authoritative for the domain/subdomain and a plurality of switches and/or servers 120a-n located having host/IP addresses within the domain/subdomain. As will be appreciated, other host computational components, such as communication devices, media servers, media gateways, communication adjuncts, and the like, can be located within the domain/subdomain but are not illustrated for purposes of simplicity. As will be appreciated, a "host" refers to any computational component on the network, whether or not its primary purpose is to provide resources via the network. As will be appreciated, the domain name servers 116a-n generally maintain records only of each of their next-level subdomains.

The domain name servers 116a-n act as both resolvers and domain name servers. In other words, they answer name resolution queries for which they are authoritative and attempt to resolve or query other name servers about information regarding domains for which they are not authoritative. The servers 116a-n are able to handle both recursive and iterative name resolution queries. As will be appreciated in recursive queries, the name server follows successive referrals until the requested information is found and, in iterative queries, the queried name server must return the requested information or the name of a name server that can in turn be queried for the requested information. To reduce network traffic and answer queries more quickly, the name servers preferably store in a cache the information that they receive in response to name resolution queries.

The switch/servers 120a-n direct communications, such as incoming Voice Over IP or VoIP calls, in an associated enterprise network serviced by the switch/server. The switch/(media) servers can be any architecture for directing contacts to one or more communication devices. Illustratively, the switch/servers 120 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s DEFINITY™ or MULTI-VANTAGE™ private-branch exchange (PBX)-based ACD system. The switch or media servers 120 typically are a stored-program-controlled systems that conventionally include interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch/servers each comprise a network interface card to provide services to the associated plurality of communication devices. The switch/servers can be decomposed into a feature server or call control server and a gateway (not shown) to provide signal control and conversion capabilities between the circuit-switched PSTN or some other type of circuit-switched network (not shown) and the packet-switched network 108.

The domain name server 116$a$-$n$ includes or is in communication with an associated activity assessment agent 124$a$-$n$, which receives activity-related (or state) information from a reporting agent 128$a$-$n$ in each of the switch/servers. The activity-related information generally describes or indicates the ability or inability of the host associated with the reporting agent to service or otherwise handle a work item, such as an incoming contact, a request for information, processor load available-bandwidth, and the like, and/or to a state of the host. For example, the activity-related information can be a metric indicative of the workload of the associated switch/server, such as estimated wait time to service a contact, actual wait time to service existing enqueued contacts, available processor (CPU) capacity, processor (CPU) capacity currently in use, lengths of work item queues (or contact center occupancy), available bandwidth, unavailable bandwidth, agent staffing levels, available agent skill levels, purpose of contact, skill level required to service a contact, number of active sessions, and the like.

Figures 2, 3:
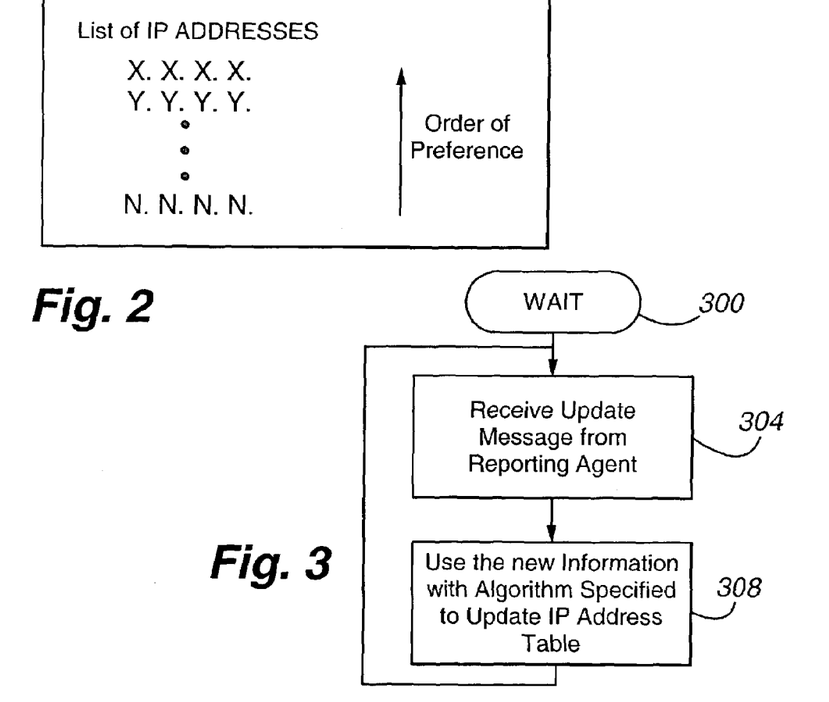
FIG. 2 depicts a list of IP addresses output by the domain server in response to a request for name resolution.
FIG. 3 depicts a first operational embodiment of the activity assessment agent.

The activity assessment agent 124 in each of the domain name servers performs traffic shaping or load balancing based on the activity-related information. This is effected by reordering a collection of addresses (typically IP addresses) such that the possible destinations of the contact are ranked in ascending or descending order of preference or according to any other suitable ordering technique. For example, FIG. 2 depicts a list of IP addresses associated with a corresponding host address or domain name. The list of destination IP addresses presents or orders the IP addresses in order of preference, with the more preferred destination address being at the top of the list and the least preferred at the bottom. The list of destination IP addresses is presented by a domain name server (acting as a server) to a domain name server (acting as a resolver) in response to a name resolution query for the associated domain name. The activity assessment agent 124 updates the ordering of the addresses in the list in response to the receipt of activity-related information from the reporting agent(s).

Any suitable algorithm may be used by the activity assessment agent to process the activity-related information and determine the desirable ordering of IP addresses. The algorithm may be as sophisticated or simple as desired. For example, in an IP telephony and contact center context the activity assessment agent can base the ordering of IP addresses on the relative estimated wait times of the switches/servers. Thus, the switch/server having the lowest estimated wait time is listed as the most preferred destination address and the switch/server having the highest estimated wait time as the least preferred destination address. A similar approach can be used for any other quantitative metric, such as available bandwidth, available processor capacity, lengths of work item queues, and the like, whereby the address having the least workload is the most preferred address and that having the most workload is the least preferred address. In another example, the agent bases the ordering of the addresses on the switch/server having the available skill(s) required to service the contact or the information of interest to the contactor. For example if the Universal Resource Locator or URL or host address has a qualifier (which denotes the nature or purpose of the contact), the qualifier can be used to route the contact. Thus, in the host address "www.ultimateelectronics.com/HDTV" the qualifier "HDTV" indicates that the contactor is interested in high density televisions. The contactor would then be directed to an agent skilled in high density televisions. Cookies may also be used to effect type of routing. Examples of other algorithms can be found in the PBX-based Customer Resource Management field. In this configuration, the activity-related information is embedded in or attached to the URL itself and is not received from a reporting agent. The assessment agent would update the IP address list ordering before selecting an IP address to return to the resolver.

The Operation of the Reporting Agent

Figure 5:
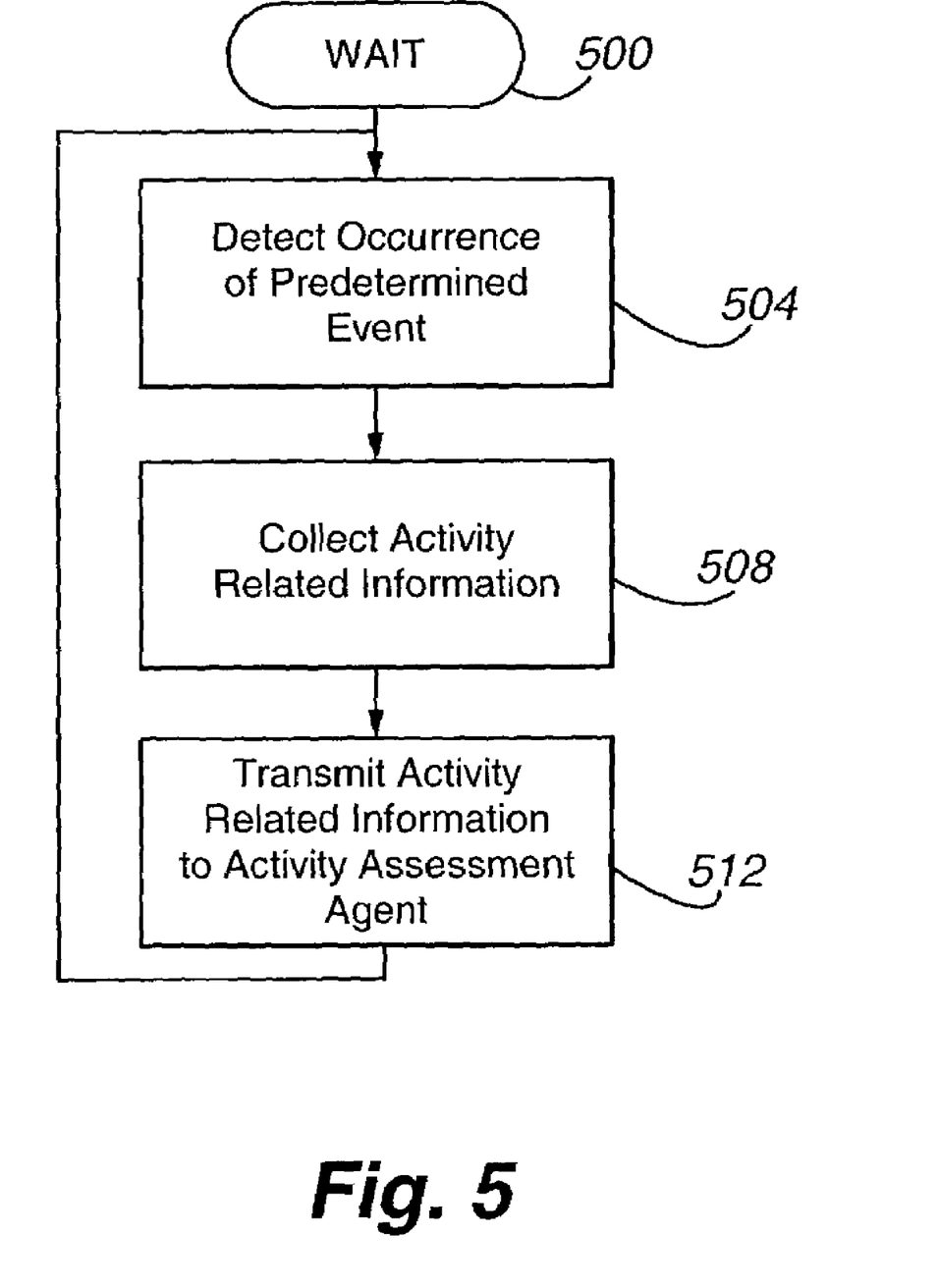
FIG. 5 depicts an operational embodiment of the reporting agent.

The operation of the reporting agent 128 will now be discussed with reference to FIG. 5.

In step 500, the agent 128 is in a wait state. When a predetermined event is detected in step 504, the agent 128 in step 508 collects selected or predetermined types of activity related information. The predetermined event can be the expiration of a selected time interval, the magnitude of one or more selected metrics such as estimated wait time, work item volume, and staffing level. The predetermined event can be detected by the agent itself or another computational component in the switch/server. In step 512, the agent 128 transmits the collected activity-related information to one or more selected activity assessment agents in the associated domain or subdomain. In a preferred configuration, the information is provided to the activity assessment agent in each of the domain name servers in the associated domain or subdomain.

The agent then returns to the wait state in step 500.

In another embodiment, the agent periodically updates internal records to reflect collected activity-related information and less frequently sends the updated information to the activity assessment agent.

Operation of the Activity Assessment Agent

Referring to FIG. 3, an operational embodiment of the activity assessment agent 124 will now be discussed.

In step 300, the agent 124 is in a wait state until an update request containing activity-related information or URL resolution request or name resolution query is received. A query is typically received for every incoming call to a URL.

In step 304, the agent 124 receives the update message from the reporting agent 128 containing the activity-related information. In step 308, the agent 124 retrieves the IP address list for the various switches/servers identified by the domain name and/or in the corresponding enterprise network from the domain name/IP address records in the associated domain server database (not shown), applies the desired algorithm to process the activity-related information, updates the ordering of IP addresses in the list based on the received activity-related information, and saves the updated IP address in the database.

The agent 124 then returns to the wait state in step 300.

Figure 4:
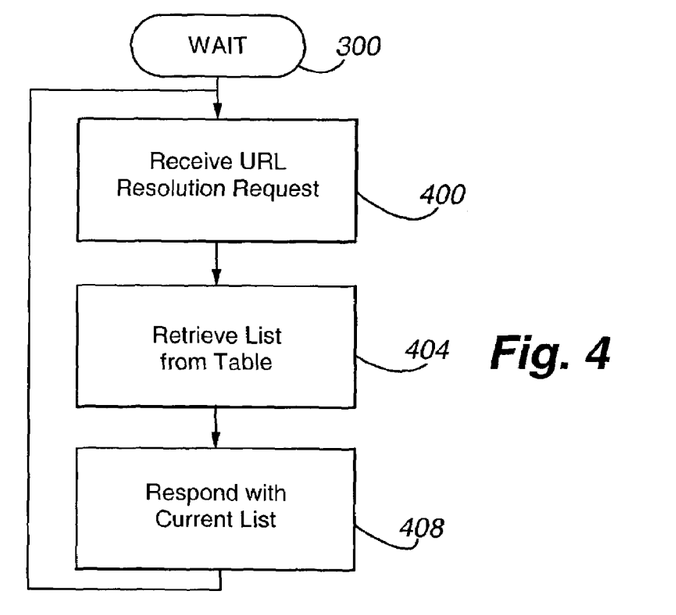
FIG. 4 depicts a second operational embodiment of the activity assessment agent.

FIG. 4 depicts a second operational embodiment of the activity assessment agent 124 when a URL resolution request is received in step 300 from a domain name server acting as a resolver or from a proxy server. In SIP, proxy servers first send a URL resolution query to a domain name server to obtain the most desired destination IP address for the URL identified in a corresponding INVITE message. This, of course, is done before forwarding the INVITE message to the URL referenced in the message.

In step 400, the agent 124 retrieves from the associated database the list of IP addresses associated with the URL in the URL resolution request. In step 404, the agent 124 effects the transmission of a response to the resolver with the most desirable IP address in the currently updated list of IP addresses associated with the URL alone or together with the currently updated list itself.

The agent then returns to the wait state in step 300.

After receiving the most desired address, the contactor will attempt a contact directly to the returned IP address.

In IP telephony, a proxy server is normally the name resolution requester. After the response to the URL resolution request is received, the requesting proxy server changes the destination address in the INVITE message (which prompted the URL resolution request) to the most preferred destination address and forwards the message to the destination. In IP telephony applications, the returned IP address will typically be the IP address of a proxy server serving the destination endpoint. The identified proxy server will take the incoming contact and direct signaling of the contact to the destination endpoint (agent or service). The endpoint serviced by the proxy server, upon receipt of the "INVITE" message, will send an "OK" message to the initiator's device. The "OK" message includes, among other things, an IP address to use for terminating the RTP stream and the IP address to use for sending the RTP stream to the initiator.

A number of variations and modifications of the invention can be used. It would be possible to provide for some features of the invention without providing others.

For example in one alternative embodiment, the methodology of the present invention is not limited to IP telephony but can be used with a group of replicated servers or a server farm in a Web site. In this embodiment, the activity assessment agent 124, based on activity-related information received from each content server in the server farm, reorders the IP address list such that incoming content requests are directed to the particular content server that is best able to service the request; that is, the request is directed to the content server that has the highest available CPU and/or currently contains the content that is sought by the request. The contactor's Web server then contacts the most preferred IP address in the IP address list.

In yet another alternative embodiment, the switches/servers 120 include one or more proxy servers, or are replaced by other knowledgeable elements, such as softswitches, media gateway controllers, and communication adjuncts. The proxy servers/other knowledgeable elements would each include a reporting agent 128 and are located with the domain/subdomain for which the associated domain name server is authoritative. The proxy servers/other knowledgeable elements update internal records based on metrics such as overall traffic/performance and upon the occurrence of the predetermined event send the information to the assessment agent in the domain name server.

In yet another alternative embodiment, a core proxy server would replace the domain name server with equivalent functionality. In other words, the above methodology is used in contact list resolution under SIP. This operation is typically performed on the user agent of the destination. As will be appreciated, a core proxy server is authoritative for an enterprise network. The domain name server could perform part of the name resolution and the core proxy the other part. In that event, the domain name server effects name resolution on the domain part of the URL (namely everything after the "@" symbol) while the core proxy server effects name resolution on the remainder of the URL.

In yet another alternative embodiment, the activity assessment and reporting agents are implemented as a logic circuit or as a combination of a logic circuit and software.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing name resolution in a packet switched network, comprising:
   providing a set of first addresses in an enterprise network corresponding to a second address, wherein a first order of at least one of the first addresses in the set of first addresses is indicative of relative desirability of contacting each of the at least some of first addresses and wherein the set of first addresses are in the first order;
   receiving activity-related information associated with at least one of the first addresses;
   based on the received activity-related information, reordering the set of first addresses to be in a second order different from the first order;

receiving a resolution query for the second address, the resolution query being associated with a contact directed to a host name, wherein the second address identifies a host that is associated with the host name, wherein the host name is associated with a contact center, wherein the contact center comprises: (a) a plurality of servicing agents operating a plurality of communication devices to service customer contacts; and (b) a plurality of switches or servers, each switch or server having a corresponding address in the set of first addresses, and wherein the received activity-related information comprises at least one of the following parameters associated with each of the at least some of the first addresses:

a wait time for a servicing agent to service the contact, wherein the wait time is at least one of estimated wait time to service the contact and actual wait time to service existing enqueued contacts;

a length of a contact queue;

a servicing agent staffing level; and an available servicing agent skill level;

providing a most desirable address in the set of first addresses in the second order in response to the resolution query; and directing the customer contacts, by the plurality of switches or servers, to a selected one of the plurality of the communication devices.

2. The method of claim 1, wherein each address in the set of first addresses is an IP address.

3. The method of claim 1, wherein the host name is a domain name.

4. The method of claim 1, wherein a most desirable first address in the set of first addresses has a lower wait time than a lesser desirable first address in the set of first addresses.

5. The method of claim 1, wherein a most desirable address in the first order is different from a most desirable address in the second order, wherein in the providing step the most desirable address in the second order is included in the at least some of the first addresses, and wherein the at least one parameter is the available servicing agent skill level, the method further comprising:

selecting a servicing agent skill level based on a logical subcomponent in a Universal Resource Locator identified in the contact.

6. The method of claim 1, wherein the at least one parameter is contact queue length, and wherein a most desirable first address in the set of first addresses has a shorter contact queue length than a lesser desirable first address in the set of first addresses.

7. The method of claim 1, wherein the at least one parameter is agent staffing level, and wherein a most desirable first address in the set of first addresses has a higher staffing level than a lesser desirable first address in the set of first addresses.

8. The method of claim 1, wherein the activity-related information further comprises available processor capacity and the most desirable address in the second order has the highest available processor capacity.

9. The method of claim 1, wherein the activity-related information further comprises a qualifier in a domain name and wherein the reordering step comprises the step of:

selecting a most desired address among the set of first addresses based on the qualifier.

10. The method of claim 1, wherein the activity-related information further comprises a cookie and wherein the reordering step comprises the step of:

selecting a most desired address among the set of first addresses based on the contents of the cookie.

11. A computer readable medium comprising processor executable instructions operable to perform the steps of claim 1.

12. The method of claim 1, wherein the customer contacts comprise voice calls.

13. A method for effecting load balancing in a packet-switched network, comprising:

providing a set of Internet Protocol (IP) addresses corresponding to a Universal Resource Locator (URL), wherein a first order of the IP addresses in the set of IP addresses is indicative of a corresponding desirability of contacting each of the IP addresses, wherein the set of IP addresses are in the first order, and wherein the URL is associated with a contact directed to a contact center, whereby the contact center comprises: (a) a plurality of servicing agents operating a plurality of communication devices to service customer contacts; and (b) a plurality of switches or servers, each contact director switch or server having a corresponding address in the set of IP addresses;

receiving activity-related information associated with at least one of the IP addresses, wherein the received activity-related information comprises at least one of the following parameters associated with each of the IP addresses:

a wait time for a servicing agent to service the contact, wherein the wait time is at least one of estimated wait time to service the contact and actual wait time to service existing enqueued contacts;

a length of a contact queue;

a servicing agent staffing level; and an available servicing agent skill level;

based at least in part on the received activity-related information, reordering the set of IP addresses to be in a second order different from the first order;

receiving a resolution query for the URL in association with the contact directed to the contact center;

providing a most desirable address in the set of IP addresses in the second order in response to the resolution query; and directing the customer contacts by the plurality of switches or servers, to a selected one of the IP addresses.

14. The method of claim 13, wherein a most desirable IP address in the set of IP addresses has a lower wait time than a lesser desirable IP address in the set of IP addresses.

15. The method of claim 13, wherein a most desirable address in the first order is different from a most desirable address in the second order.

16. The method of claim 13, wherein the at least one parameter is the available servicing agent skill level, the method further comprising:

selecting a servicing agent skill level based on a logical subcomponent in a URL identified in the contact.

17. The method of claim 13, wherein the at least one parameter is contact queue length, and wherein a most desirable first address in the set of IP addresses has a shorter contact queue length than a lesser desirable address in the set of IP addresses.

18. The method of claim 15, wherein the at least one parameter is agent staffing level, and wherein a most desirable first address in the set of IP addresses has a higher staffing level than a lesser desirable first address in the set of IP addresses.

19. The method of claim 13, wherein the activity-related information further comprises a qualifier in a domain name and wherein the reordering step comprises the step of:
  selecting a most desired address among the set of IP addresses based on the qualifier.

20. The method of claim 13, wherein the activity-related information further comprises a cookie and wherein the reordering step comprises the step of:
  selecting a most desired address among the set of IP addresses based on the contents of the cookie.

21. A computer readable medium comprising processor executable instructions operable to perform the steps of claim 13.

22. The method of claim 13, wherein the customer contacts comprise voice calls.

23. A system of effecting traffic shaping in a packet-switched network, comprising:
  (a) an enterprise network comprising of a plurality of nodes corresponding to a set of first addresses, wherein the set of first addresses are associated with a second address, wherein a first order of the first addresses in the set of first addresses is indicative of a relative desirability of contacting each of the first addresses, and wherein the set of first addresses are in the first order; and
  (b) an activity assessment agent operable to:
    (i) receive activity-related information associated with at least one of the first addresses;
    (ii) based at least in part on the received activity-related information, reorder the set of first addresses to be in a second order different from the first order;
    (iii) receive a resolution query for the second address, the resolution query being associated with a contact directed to a host name, wherein the second address is the host name, wherein the host name is associated with a contact center, wherein the contact center comprises: (A) a plurality of servicing agents operating a plurality of communication devices to service customer contacts; and (B) a plurality of switches or servers, each switch or server having a corresponding address in the set of first addresses, and wherein the received activity-related information comprises at least one of the following parameters associated with each of the at least some of the first addresses:
      a wait time for a servicing agent to service the contact, wherein the wait time is at least one of estimated wait time to service the contact and actual wait time to service existing enqueued contacts;
      a length of a contact queue;
      a servicing agent staffing level; and
      an available servicing agent skill level;
    (iv) provide a most desirable address in the set of first addresses in the second order in response to the resolution query; and
    (v) cause the customer contacts to be directed by the plurality of switches or servers to a selected one of the plurality of the communication devices.

24. The system of claim 23, wherein each address in the set of first addresses is an IP address.

25. The system of claim 24, wherein the host name is a domain name.

26. The system of claim 23, wherein the customer contacts comprise voice calls.

27. The system of claim 23, wherein a most desirable first address in the set of first addresses has a lower wait time than a least desirable first address in the set of first addresses.

28. The system of claim 23, wherein a most desirable address in the first order is different from a most desirable address in the second order, wherein in the provide operation (iv) the most desirable address is included in the at least one of the first addresses, wherein the parameter is the available servicing agent skill level, and wherein the activity assessment agent is further operable to select a servicing agent skill level based on a logical subcomponent in a Universal Resource Locator identified in the contact.

29. The system of claim 23, wherein the at least one parameter is contact queue length, and wherein a most desirable first address in the set of first address has a shorter contact queue length than a lesser desirable first address in the set of first addresses.

30. The system of claim 23, wherein the at least one parameter is agent staffing level, and wherein a most desirable first address in the set of first addresses has a higher staffing level than a lesser desirable first address in the set of first addresses.

31. The system of claim 23, wherein the activity-related information further comprises available processor capacity and the most desirable address in the second order has the highest available processor capacity.

32. The system of claim 23, wherein the activity-related information further comprises a qualifier in a domain name and wherein the reordering operation comprises the function of:
  selecting a most desired address among the set of first addresses based on the qualifier.

33. The system of claim 23, wherein the activity-related information further comprises a cookie and wherein the reordering operation comprises the function of:
  selecting a most desired address among the set of first addresses based on the contents of the cookie.

34. The system of claim 23, further comprising:
  (c) a reporting agent located in a host device in the enterprise network, the reporting agent being operable to collect and provide the activity-related information to the activity assessment agent.

35. The system of claim 34, wherein the activity assessment agent is part of a domain name server authoritative for a domain including the enterprise network and further comprising a plurality of reporting agents corresponding to a plurality of host devices in communication with the activity assessment agent and having addresses within the domain, wherein at least some of the reporting agents have addresses outside of the enterprise network.

* * * * *